US007739163B1

(12) United States Patent
Geller et al.

(10) Patent No.: US 7,739,163 B1
(45) Date of Patent: Jun. 15, 2010

(54) USER INTERFACE AND METHOD FOR FACILITATING A REALTY TRANSACTION

(75) Inventors: Steven Geller, Far Rockaway, NY (US); Aaron Birnbaum, Brooklyn, NY (US)

(73) Assignee: Meridian Capital Group LLC, New York, NY (US)

( * ) Notice: Subject to any disclaimer, the term of this patent is extended or adjusted under 35 U.S.C. 154(b) by 700 days.

(21) Appl. No.: 10/639,611

(22) Filed: Aug. 12, 2003

Related U.S. Application Data

(60) Provisional application No. 60/403,171, filed on Aug. 12, 2002.

(51) Int. Cl.
*G06Q 40/00* (2006.01)
(52) U.S. Cl. .......................................... 705/35; 705/26
(58) Field of Classification Search .................. 705/36, 705/27, 35, 26
See application file for complete search history.

(56) References Cited

U.S. PATENT DOCUMENTS

| | | | | |
|---|---|---|---|---|
| 5,179,652 | A * | 1/1993 | Rozmanith et al. | 715/747 |
| 5,185,857 | A * | 2/1993 | Rozmanith et al. | 715/507 |
| 5,806,079 | A * | 9/1998 | Rivette et al. | 715/512 |
| 6,219,679 | B1 * | 4/2001 | Brisebois et al. | 715/501.1 |
| 6,301,586 | B1 * | 10/2001 | Yang et al. | 707/104.1 |
| 6,321,202 | B1 * | 11/2001 | Raveis, Jr. | 705/1 |
| 6,332,131 | B1 * | 12/2001 | Grandcolas et al. | 705/35 |
| 6,622,128 | B1 * | 9/2003 | Bedell et al. | 705/30 |
| 7,111,232 | B1 * | 9/2006 | Bascom | 715/513 |
| 2001/0005829 | A1 * | 6/2001 | Raveis, Jr. | 705/1 |
| 2002/0046159 | A1 * | 4/2002 | Raveis, Jr. | 705/38 |
| 2002/0049624 | A1 * | 4/2002 | Raveis, Jr. | 705/8 |
| 2002/0107906 | A1 * | 8/2002 | Brockbank | 709/203 |
| 2003/0163444 | A1 * | 8/2003 | Kotzin | 707/1 |

OTHER PUBLICATIONS

"First American Real Estate Solutions Releases New Version of Popular Win2Data Software;" Sep. 19, 2001; PR Newswire, New York; 2pp. p. 1-2.*
Flanagan, Glenn; "Canuck investors find a home: Investcom has data and research from our markets;" National Post (Toronto Edition 1); Don Mills, Ont.; Jul. 29, 2000; p. C6.*

* cited by examiner

*Primary Examiner*—Jeffrey A. Smith
*Assistant Examiner*—Adam Levine
(74) *Attorney, Agent, or Firm*—Seth H. Ostrow, Esq.; Ostrow Kaufman & Frankl LLP

(57) ABSTRACT

The present invention provides methods and systems for facilitating a realty transaction using a computer system including at least one database. A first informational computer screen display is provided for displaying information obtained from the database about one or more real properties. Navigation by a single user selection is allowed from the first display to any one of at least two additional computer screen displays, including a display including information about closed realty deals facilitated by the computer system and on the first street, and a display including information about closed realty deals facilitated by the computer system and relating to the first property.

16 Claims, 16 Drawing Sheets

Description of prop

- Number of buildings
- Elvator/Walkup
- Building size
- Frontage
- Description
- Number of stories
- Commer/Mixed use
- Lot size
- Frontage Assessed value:
- Actual
- Year
- Transitional

Rent Roll

Residential Details — 604

- Appartements
- Rooms
- Yearly rent

Commercial Detail — 605

- Stores
- Sq. Ft.
- Yearly rent

Income/Expenses

Income — 606
Expenses — 607

- Vacancy Amount
- Net operation income
- Vacancy %

Defaults | Print | Close

USER INTERFACE AND METHOD FOR FACILITATING A REALTY TRANSACTION

RELATED PRIORITY APPLICATION

This application claims priority to U.S. Provisional Application No. 60/403,171, filed on Aug. 12, 2002, which application is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to a system and method for facilitating a realty transaction. More specifically, the disclosed invention relates to a system and method for processing financial and other information related to a realty transaction.

Publicly available realty information is useful to aid in marketing realty-related products and services. Public realty information is often located in depositories held and maintained by state and/or local government. The Real Property Assessment Division ("RPAD") in New York, for example, maintains a compilation of information relating to realties within its jurisdiction. The compiled realty information includes the block and lot number of the property, the owner of the property, and the last known mortgage lendor on the property. However, the RPAD system does not allow the public to conduct comprehensive searching of information and some of its information is incomplete and comprises limited information fields. Furthermore, a user can only search information by block and lot number. For example, RPAD lacks information relating to the percentage of a given property that is vacant, information relating to the owner of the property, information relating to properties in other jurisdictions, etc.

Traditional methods of utilizing publicly available realty information comprised transcribing the information on note cards. Additionally, First American Real Estate Solutions® markets a software product, entitled Win2Data®. The Win2Data software comprises a database of realty information, such as the name of the property owner and mortgage lendor for a given property. However, the Win2Data software does not allow for simultaneous display of multiple records, its searching capabilities are limited, and user access is restricted to the realty information provided with the Win2Data software. The product is limited in its search, sort, presentation, and other processing abilities and is not well suited for on-demand, real-time access to comprehensive realty information.

These and other disadvantages contribute to the absence of an effective system or method for processing financial and other information related to a realty transaction. By way of example, one may consider the situation where a salesperson is using realty information in a database to identify a property owner and "close" the property owner on a telephone deal call to refinance the property. In closing the deal, the social dynamic between the salesperson and the property owner requires the salesperson to be quick with information, arguments, rebuttals, scripts, etc. It would thus be advantageous for the salesperson to be able to simultaneously view and quickly navigate large amounts of information relating to the specific property, property owner, property contact, neighborhood, etc. Existing systems are not equipped for this example scenario. There thus remains a need for a system and method that facilitates on-demand, real-time access to dynamic collections of comprehensive realty information.

BRIEF SUMMARY OF THE INVENTION

The present invention is a system and method for facilitating a realty transaction. More specifically, the disclosed invention relates to a system and method for processing financial and other information related to a realty transaction.

In accordance with the present invention, a comprehensive database of realty data is provided including data from public and private sources, and an intelligent user interface is provided to clients to allow access to the realty data in a fashion consistent with the needs during a telephone call or other communication. During the course of such communication, the client is attempting to close a deal, such as a mortgage refinancing deal, with the owner of the property subject to the current mortgage. The user interface has a primary screen, referred to as the deal information screen, that is divided into constituent screen portions, such as quadrants or halves. A user can then alternate between various constituent screens simply by selecting a corresponding tab, button, etc. The present invention is friendly to the novice user and facilitates easy navigation in an organized and speedy fashion through various information screens. A user thus obtains desired information in an efficient manner that reduces both the number of information sources that need to be checked by the user as well as the amount of duplicate information that must be sifted through.

A database management system ("DBMS") and database files reside on a dedicated or non-dedicated realty transaction database server or other computer. A plurality of the client computers are adapted to access the database server, and a user of a client computer interfaces the DBMS and database files via a graphical user interface ("GUI"). The database server passes user-selected records to the user at the client computer for display via the GUI. Upon requests from the client machines, the database server searches the database for selected records and passes them back over the network. In one embodiment, the client computer and database server are a single computer. In another embodiment, only a single client computer is adapted to access the database server.

The graphical user interface comprises a plurality of information screens containing information fields that are cross-referenced to a plurality of other information fields. The relationships can be relational, hierarchical, or object-defined. In one embodiment, an information screen simultaneously displays publicly available realty information and non-public proprietary realty information. The proprietary realty information and publicly available realty information can be used to correct any inaccurate publicly available realty information.

In one embodiment, the information screens are partitioned into a plurality of constituent screens, where at least one constituent screen is interchangeably switched with any of a plurality of alternative constituent screens at the direction of the user. The constituent screens and alternative constituent screens include information fields and/or a photograph or other graphic of the subject real estate. At least one of the constituent screens contains information fields that allow the user to input proprietary realty information. The constituent screens are interchangeable on an on-demand, real-time basis.

In one embodiment, the system and method of the present invention includes a two-way communications device, such as telephone, video, on-line chat, etc. The user extracts offeree information from the information fields and communicates with an offeree with the purpose of closing a successful deal on a potential realty transaction. In one embodiment, the user communicates quote information to the offeree. The quote information can comprise realty refinancing financial information. If the offeree rebuts the deal or if the user otherwise desires to entice the offeree into closing the deal, the user navigates through the information screens and/or the constituent screens on an on-demand, real-time basis. As used herein, the terms "close", "deal", "closing a deal", etc. relate to a user receiving at least a non-binding commitment from an offeree to enter into a prospective realty-related transaction. The commitment is not necessarily legally binding but indicates an offeree interest in a potential transaction.

In one embodiment, the user communicates realty information extracted from the database files to the offeree so as to convey to the offeree an impression that the user is competent and knowledgeable about the deal proposed by the user. In one embodiment, the DBMS is adapted so that the user may input proprietary realty information obtained during the course of the two-way communication. This proprietary realty information can correct inaccurate publicly available realty information and it merges with the realty information. In one embodiment, the database accesses realty documents related to realty that is subject to a deal. The documents are displayed to the user to communicate to the offeree and/or a related entity such as the offeree's attorney, lender, etc.

In one embodiment, the invention provides a method for facilitating a realty transaction using a computer system, the computer system including at least one database. The method includes providing a first informational computer screen display for displaying information obtained from the database about one or more real properties. The method further includes allowing navigation by a single user selection from the first display to any one of at least two additional computer screen displays. The at least two additional displays are for providing additional information about at least a first one of the one or more real properties, the first real property being located on a first street. The at least two additional displays include a first additional display comprising information about closed realty deals facilitated by the computer system and on the first street, and a second additional display comprising information about closed realty deals facilitated by the computer system and relating to the first property.

In another embodiment, the invention provides a computer system for facilitating a realty transaction, the computer system including at least one computer and at least one database accessible by the at least one computer. A first informational computer screen display is provided on a first computer of the at least one computer, the first display being for displaying information obtained from the database about one or more real properties. Navigation is allowed by a single user selection from the first display to any one of at least two additional computer screen displays, the at least two additional displays being for providing additional information about at least a first one of the one or more real properties, the first real property being located on a first street. The additional displays include a first additional display including information about closed realty deals facilitated by the computer system and on the first street, and a second additional display comprising information about closed realty deals relating to the first property.

Additional aspects of the present invention will be apparent in view of the description which follows.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 is a screen diagram presenting an embodiment of the deal information screen comprising an existing constituent screen and a notes constituent screen;

FIG. 5 is a screen diagram presenting an embodiment of the deal information screen comprising a set up constituent screen and a notes constituent screen;

FIG. 6 is a screen diagram presenting an embodiment of the full screen set up screen;

FIG. 7 is a screen diagram presenting an embodiment of the deal information screen comprising a select quote constituent screen and a notes constituent screen;

FIG. 10 is a screen diagram presenting an embodiment of the deal information screen comprising a master constituent screen and a "to do" constituent screen;

FIG. 11 is a screen diagram presenting an embodiment of the deal information screen comprising a master constituent screen and a history constituent screen;

FIG. 13 is a screen diagram presenting an embodiment of the deal information screen comprising a master constituent screen and a quotes constituent screen;

FIG. 14 is a screen diagram presenting an embodiment of the deal information screen comprising a master constituent screen and an e-mail constituent screen;

DETAILED DESCRIPTION OF THE PREFERRED EMBODIMENTS

Figure 1:
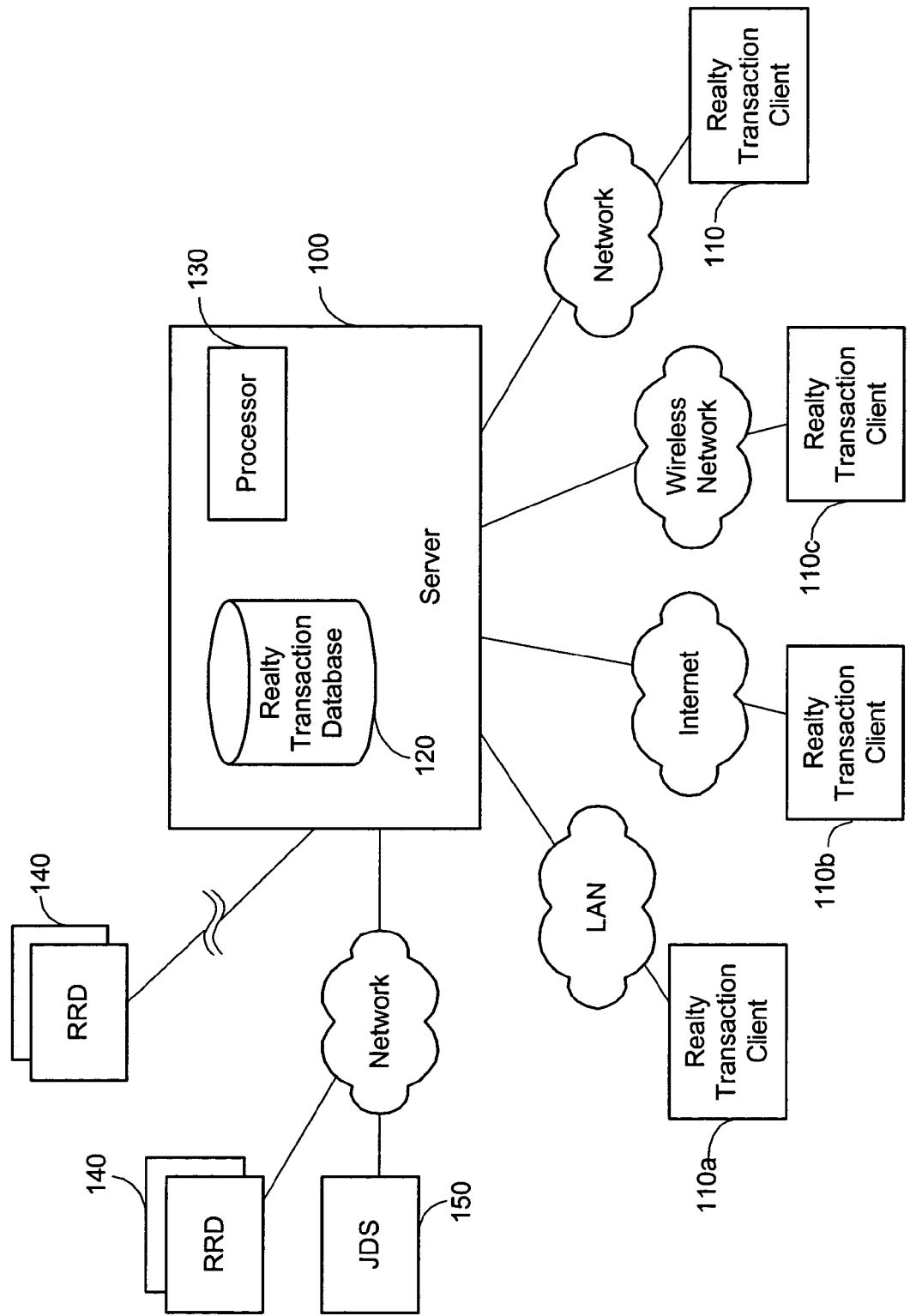
FIG. 1 is a topology diagram presenting an embodiment of the present invention.

Referring to FIG. 1, a database server 100 is accessible by at least one of a plurality of realty transaction client computers 110. A client computer 110, also referred to as a user computer 110, comprises at least one of a dedicated LAN user computer 110*a*, an Internet-routed user computer 110*b*, a wirelessly connected user computer 110*c*, or a user computer 110 with other connectivity. A database management system ("DBMS") and database files reside on the database server 100. The database server 100 can be dedicated or not dedicated and comprises at least one realty transaction database 120 and at least one processor 130. The present invention contemplates that the components of FIG. 1 can be arranged in any distributed or non-distributed manner so long as a user of user computer 110 can access the portions of the DBMS and database files for which that particular user has security rights. A user retrieves data files via a graphical user interface ("GUI") displayed at the user computer 110. The user utilizes the GUI to retrieve and navigate between information screens, navigate fields, enter data, etc. As used herein, the database client, is also referred to as the computer user, broker, customer service representative ("CSR"), etc.

In one embodiment, realty-related documents 140 are connected to the server 100 for importation into the server 100 database files. The realty-related documents ("RRD") 140 either reside on a computer-readable medium or exist in a traditional format, such as paper for example. The information contained within the realty-related documents 140 can be imported in any number of ways, including via a network, dedicated connection, manual data entry, VPN, and other methods known in the art. In one embodiment, a jurisdiction document system ("JDS") 150 is connected to the server 100 via a network, such as the Internet for example. Each JDS 150 contains publicly available documents relating to a property in a given jurisdiction. The JDS 150 is accessible and GUI-activated by a user via a user computer 110 and will be discussed below in further detail. In one embodiment, more than one JDS 150 is present for multiple jurisdictions.

Figure 2:
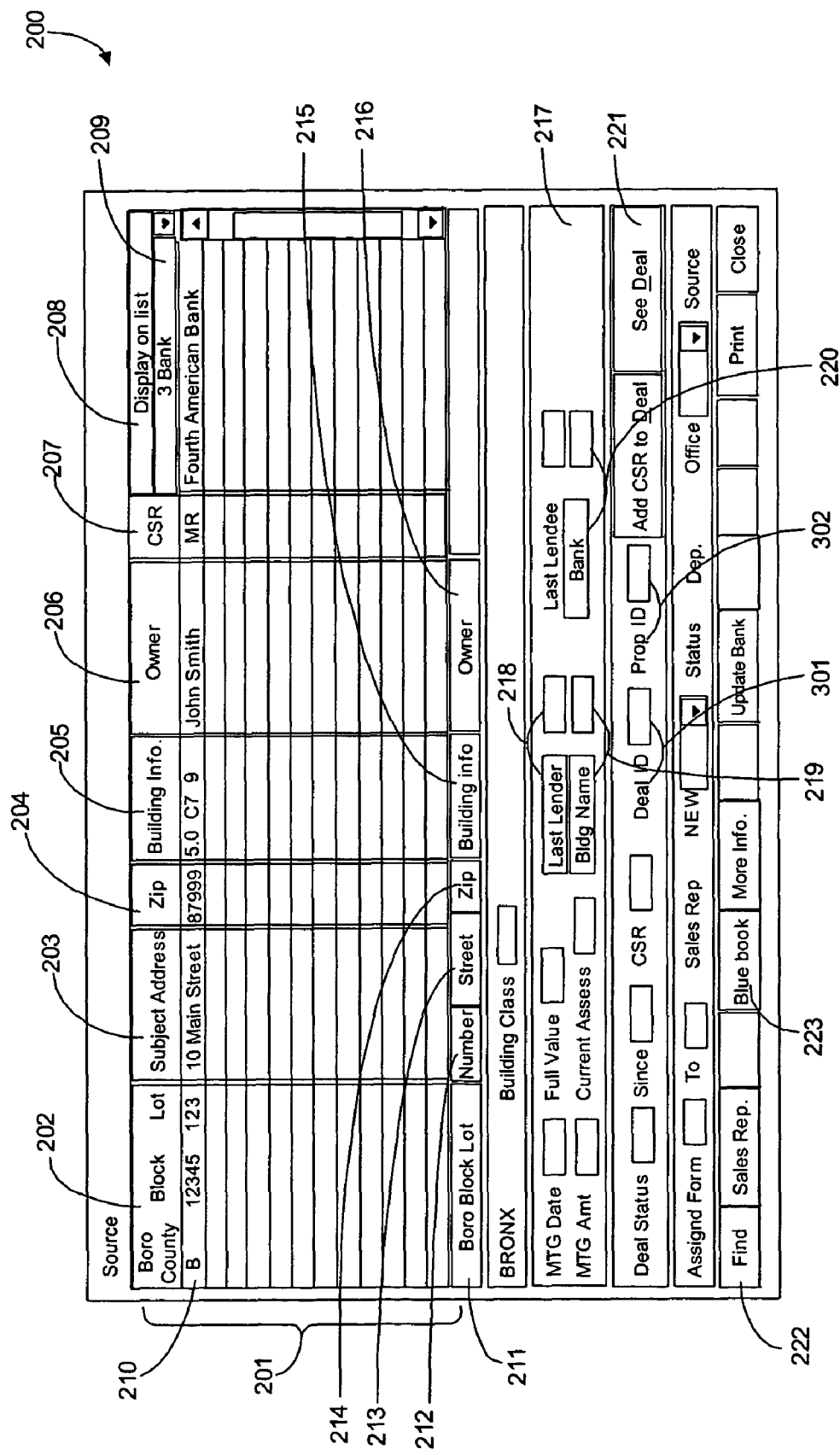
FIG. 2 is a screen diagram presenting an embodiment of the master information screen.

Referring to FIG. 2, a GUI-retrieved master information screen 200 displays realty information relating to all property blocks and lots in the system. The master information screen 200 displays realty information imported from such sources as RPAD and other publicly available information sources as well as proprietary information sources. The master information screen comprises vertical entry sets 201. In one embodiment, the master information screen 200 contains a borough, county, block and lot information field set 202, a street address information field set 203, a zip code information field set 204, a building information field set 205, an owner information field set 206, a customer service representative ("CSR") information field set 207, and a supplemental information field set 208. Each of 202-208 comprises a corresponding column heading.

The supplemental information field set 208 comprises a drop-down menu, where the user can select an additional field of information to be displayed. For example, the supplemental information field set 208 comprises a choice of last known realty lender, last lendee, bank, and building name. When the user selects a choice of supplemental information, the information listed in the supplemental information field set 208 is associated with that choice. For example, when "building name" is chosen from a drop-down menu 209, information in the corresponding supplemental information field set 208 relates to building name. The presence of a bank name in the supplemental information field set 208 indicates that a deal has closed on the subject realty. In one embodiment, the information in any given vertical entry set 201 is relational with all and any of the other information in the same vertical entry set 201.

For the purpose of example and without limitation, a horizontal entry set 210 comprises "B 12345 123" where it crosses the borough, county, block and lot information field set 202, "10 Main Street" where it crosses the street address information field set 203, "87999" where it crosses the zip code information field set 204, "5.0 C7 9" where it crosses the building information field set 205, "John Smith" where it crosses the owner information field set 206, "MR" where it crosses the customer service representative ("CSR") information field set 207, and "Fourth American Bank" where it crosses the supplemental information field set 208. These fictitious data entries have been arbitrarily selected for the purpose of example, however in practice, the data entries are non-fictitious.

In this example, 5.0 C7 9 is used as code for information that cannot fit in a small field space. In one embodiment, the user can select any one of the three codes (5.0, C7, and 9 in this example) by double-clicking with a mouse, for example, to activate a display that explains what the coded information represents (not shown). For example, the three pieces of information in the building information field may respectively represent number of units, type of realty, and number of rooms, where 5.0 C7 9 are illustrative codes to that represent 5 units, "over six families with stores", and 9 rooms. In one embodiment, the activated display also shows the list of all codes and the information that all codes represent.

The CSR information field set 207 is used to represent the initials or name of a salesperson, executive, customer service representative, or any other personnel that has previously accessed the corresponding horizontal entry set 210. The presence of information where the CSR informational field set 207 and a corresponding horizontal entry set 210 cross indicates to the user that there is deal information related to the corresponding horizontal entry set 210 in the deal information screen 300. An absence of information at the cross indicates to the user an absence of deal closing information. The deal information is displayed on the deal information screen 300 which will be described below in further detail.

The master information screen 200 simultaneously displays an n number of horizontal field sets 210. The n horizontal field sets 210 are a subset of the database files on the database server 100 contained in t horizontal field sets 210. The t horizontal field sets 210 represent the full number of main information screen horizontal field sets 210 in the database files. The user selects which of t horizontal field sets 210 are to be displayed by scrolling, searching, or other means known in the art. In one embodiment, the various information entries that make up a given horizontal field set 210 have a relationship with the corresponding entry in the borough, county, block and lot information field set 202. For example and without limitation, this relationship can be hierarchical. In other words, a given entry for boro, block, and lot is never duplicated and all entries in the given entry's horizontal field set have a hierarchical relationship with the boro, block, and lot entry. In one embodiment, the relationship between any field and any other field is an object-defined relationship.

The horizontal field sets 210 are displayable in a sorted manner. For example, the user can activate buttons to sort the records by any given criteria. Such buttons include a boro block and lot sort button 211, a street number sort button 212, a street name sort button 213, a zip code sort button 214, a building info sort button 215, and an owner sort button 216. The use of buttons is for the purpose of illustration and is interchangeable with other methods known in the art. Methods and systems of GUI construction and use are known in the art and include, for example, buttons, tabs, menus, tables, fields, etc. In one embodiment, other methods of sorting are utilized.

In one embodiment, the master information screen 200 comprises a master information screen ("MIS") constituent screen 217. The MIS constituent screen 217 displays information related to a user-selected horizontal entry set 210. For example, the MIS constituent screen 217 displays mortgage date, mortgage amount, full value, current assessments, last lender 218, building name 219, last lendee, bank 220, deal status and date, CSR, deal ID 301, property ID 302, assignment date(s), information source, office/jurisdiction, and an Add CSR button. The horizontal entry sets 210 can be sorted by utilizing the user-actionable buttons associated with the last lender 218, the building name 219, and bank 220. The MIS constituent screen 217 contains a user-actionable deal retrieve button 221 to display the deal information screen 300 corresponding to the selected horizontal field set 210. The deal ID 301, property ID 302, and deal retrieval button 221 are further discussed below in detail with reference to the deal information screen 300.

The master information screen 200 also comprises a MIS find button 222. Rather than scrolling through up to t horizontal field sets 210 to locate a desired field set, the user may click on the MIS find button 222. The find button 222 actives another display containing search fields, such as street number, street name, etc. The user enters a search string in any one of the search fields to activate the find function. In one embodiment, the find function does not require exact string matching.

In one embodiment, the master information screen 200 can contain additional features to activate additional functionalities. Such functionalities may be novel and/or comprises database functionalities known in the art such as printing, for example. In one embodiment, the master information screen 200 contains a "do not call" flag to indicate to a user than a particular party should not be contacted (not shown). In one embodiment, the master information screen 200 contains a bluebook button 223, for example, designed to display to the user how selected information appeared in its original information source. The bluebook button 223 can also be located in the deal information screen 300 discussed below.

Figure 3:
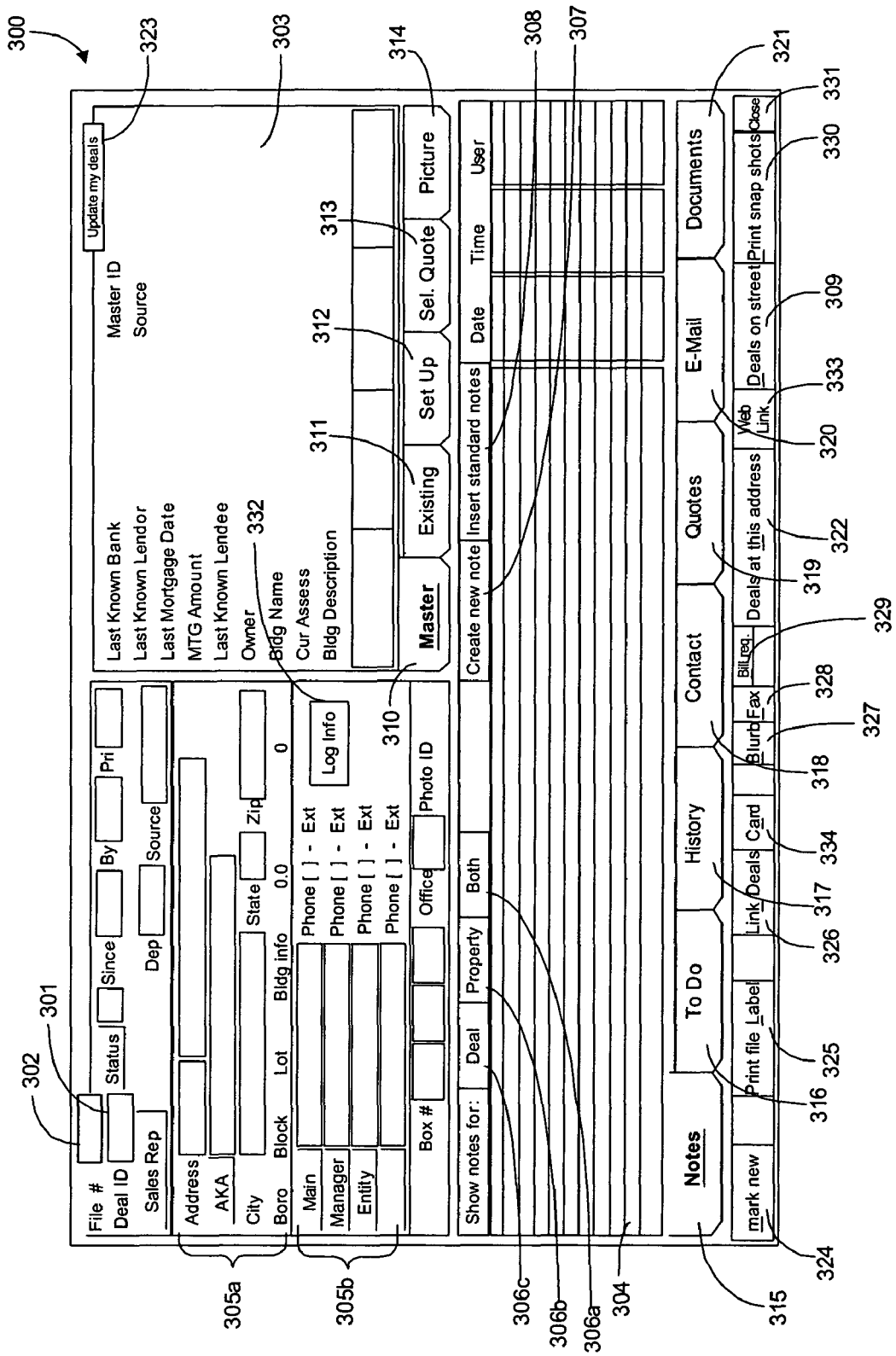
FIG. 3 is a screen diagram presenting an embodiment of the deal information screen comprising a master constituent screen and a notes constituent screen.

Referring to FIG. 3, an embodiment of the deal information screen 300 comprises a "master" constituent screen 303 and a "notes" constituent screen 304. The deal information screen 300 comprises information fields for deal ID 301, property ID 302, and file ID 303. In one embodiment, the database files are searchable by deal ID 301 an file ID 303 to retrieve a corresponding deal information screen 300. In other embodiments, the database files are searchable by name, street address, CSR, etc. The deal information screen 300 comprises address information fields 305*a* and contact information fields 305*b* for the retrieved deal. In one embodiment, the address information fields 305*a* and contact information fields 305*b* may each be comprised of 1-2 lines or fields, however in some embodiments, the address information fields 305*a* or contact information fields 305*b* may each be comprised of 3 or more lines or fields. In one embodiment, there is an APN (assessor parcel number) field (not shown) for displaying the APN.

The master constituent screen 303 contains information similar to the MIS constituent screen 217, and the notes constituent screen 304 articulates previously entered notes on the deal ID 301 referenced and displayed by the deal information screen 300. In one embodiment, the notes constituent screen 304 comprises notes concerning the subject realty as well as notes concerning a specific deal related to the subject realty. Both types of notes are simultaneously displayed when the user clicks on the "both" notes button 306*a*, however the user can display just the property notes by clicking on a property notes button 306*b* and the user can display just the deal notes by clicking on the deal notes button 306*c*.

The notes constituent screen 304 can be used to enter and/or display any notes that are relevant to the property and/or deal and any relevant information that can be used to close a deal with an offeree. An offeree is usually the property owner, however the offeree may be another party, such as a property contact or authorized representative, for example. For the purpose of illustrations and without limitation, the deal can relate to a mortgage refinancing offer and the notes can articulate an interest rate that the offeree and/or realty contact is known to desire for the potential refinancing deal. In other embodiments, the deal relates to other potential transaction involving property, real or otherwise.

Notes are entered by the user by activating a create new note button 307 (to enter a customized note), or the user can activate the insert standard notes button 308 (to subsequently choose from a list of common notes) (not shown). In one embodiment, the notes constituent screen 304 also contains additional fields for annotating a corresponding note with date, field, and user (CSR) information. Among other things, the information in the notes field can be used by a user to entice a hesitant offeree into closing a deal on a prospective realty transaction, such as a mortgage refinancing deal, for example.

The deal information screen 300 comprises a "Deals on the Street" ("DOS") button 309. When the user activates the DOS button 309, the user is presented with a screen containing information related to deals closed by a user on the same street that the subject property is located (not shown). The DOS function is an effective tool in closing a hesitant offeree. One obstacle to closing a deal with an offeree is trust and comfort with the user. A user attempts to overcome this obstacle by displaying competence and familiarity with the subject realty and related financial information. The user enhances the probability of closing the deal with the offeree when the user displays additional familiarity with the subject property's neighborhood and further, when the user can quickly communicate to the offeree other deals that a user has closed in the property's neighborhood.

One embodiment of the deal information screen 300 comprises user-actionable tab buttons comprising a "master" button 310, an "existing" button 311, a "set up" button 312, a "select quote" button 313, and a "picture" button 314. Each of tab buttons 310-314 corresponds with a constituent screen to be selectively displayed as part of the deal information screen 300. For example, when a user presses the existing button 311, the master constituent screen 303 is replaced by an "existing" constituent screen 500. The existing constituent screen 500 is discussed below in further detail.

In one embodiment, the deal information screen 300 comprises user-actionable tab buttons comprising a "notes" button 315, a "to do" button 316, a "history" button 317, a "contact" button 318, a "quotes" button 319, an "e-mail" button 320, and a "documents" button 321. Each of tab buttons 315-321 corresponds with a constituent screen to be selectively displayed as part of the deal information screen 300. For example, when a user presses the "to do" button 316, the notes constituent screen 304 is replaced with the "to do" constituent screen 1000. The to do constituent screen 1000 will be discussed below in further detail.

The deal information screen 300 comprises a "deals at this address" ("DTA") button 322. Analogous to the functionality of the DOS button 309, when the user activates the DTA button 322, the user is presented with a screen (not shown) containing information related to deals closed by a user on the same property as the property subject to a potential deal. An absence of user familiarity with prior deals may cause the offeree to regard the user as a novice and cause the offeree to rebut any potential deal. However, user familiarity with prior deals on the property are useful in closing a deal with the offeree.

The information contained in the deal information screen 300 is modifiable by a user. Further, the information contained within the various deal information screen 300 constituent screens discussed below can also be set by the database administrator to be modifiable. The "update my deals" button 323 is used to save the modified information into the database files. In one embodiment, not all users have access to a functional update my deals button 323 for particular fields of information, depending upon the allocation of security rights. Furthermore, the present invention is easily upgradeable to include additional features.

In one embodiment, the deal information screen 300 comprises any or all of a mark new button 324, print file label button 325, link deals button 326, "blurb" button 327, fax button 328, a bill reg. button 329, a print snap shot button 330, and a close button 331. The mark new button 324 flags the subject deal as being recent allowing the subject to show up in a future search of recent deals. The print file label button 325 creates a label for a hard file of the subject deal. The link deals button 326 activates a display (not shown) that permits the user to enter any number of deals (by Deal ID, Property ID, CSR, etc.) to be associated with each other, thereby flagging all associated deals in a future search for one of the associated deals. The blurb button 327 activates the display of another screen (not shown). The screen activated by the blurb button 327 permits the user to enter an abstract of the subject deal to be posted to a selected or predetermined web site.

The fax button 328 activates a display where the user can enter information to be printed on a fax cover sheet. The bill reg. button 329 permits a user to send selected information of the subject deal to an accounting and/or billing department associated with the user's employer, for example. The close button 331 comprises one way of exiting the deal information screen 300. In one embodiment, the print snap shot button 330 sends a copy of the deal history to a printer. In one embodiment, the print snap shot button 330 can also be used to send other information to the printer. For example, in one embodiment, actuation of the print snap shot button 330 displays a print snap shot intermediary screen (not shown). In one embodiment, the print snap shot button 330 send deal information to the printer that is associated with the offeree of the subject deal. This deal information may correspond to all deals in the system associated to the offeree of the subject deal including at least deal status information of all deals. In one embodiment, the print snap shot intermediary screen displays deal status information corresponding to all deals for the offerree of the subject deal, thereby permitting the user to select which deals, and associated deal information, will be included in the information sent to the printer.

In one embodiment, the deal information screen 300 comprises a "card" button 334, designed to display to the user how selected deal information appeared in its original format as a paper lead card, if applicable. In one embodiment, the deal information screen 300 and master information screen 200 contain a plurality of source buttons, each associated with an information source and/or a legacy database, and each for displaying corresponding information as it appeared in its original information source or format. For example, the master information screen 200 can also include a card button.

In one embodiment, the deal information screen 300 comprises a "log info" button 332. The log info button 332 appears on the deal information screen 300 if the user has administrative and/or management rights access. Subsequent to activating the log info button 332, a user is shown a log info screen (not shown) that communicates to the user a list of all users that have accessed the current deal. In one embodiment, the user can also select a user from the list of users to see all deals that the selected user has accessed within a chosen period of time. This feature is particularly useful in identifying individuals that are accessing deals in a manner indicative that the individual may be misappropriating deal information.

In one embodiment, the deal information screen 300 comprises a "web link" button 333. Some jurisdictions maintain their realty-related documents online so that the documents are viewable over the Internet. Usually, a user is required to input via the browser an assessor parcel number ("APN") associated with the realty in order to access the corresponding documents. The web link button 333 appears on the deal information screen 300 and activates an Internet connection and browser, and initiates that automatic input of the APN number to the jurisdiction document system ("JDS") 150. Thus, subsequent to activating the web link button 333, a user is taken to the JDS 150 of the related jurisdiction and the document collection related to the subject realty is automatically displayed.

In one embodiment, the method for facilitating a realty transaction includes a lead management feature. Often times, it is known that a property owner associated with imported realty information may be in a position where he is more likely to close a deal with a user. This type of imported realty information is referred to as "leads." A user may desire authority to close a deal on a lead because users work for commission based on the number and value of deals closed. At the same time, employers of users have an interest in seeing that every lead is acted upon so as to maximize the possibility that a deal will be closed based on the lead. Thus, when a specific user has been allocated authority to attempt to close a deal on a lead, but the specified user does not act on the lead, the lead management feature functions to alert the specified user's employer or other party that the specified user is not acting on the lead. This gives the employer an opportunity to allocate authority to an alternative user so that the lead is acted upon before it gets "stale."

In one embodiment, the leads management feature senses that a lead has not been acted upon by the specified user when the specified user has failed to enter any data into the deal information screen 300 for the lead deal within a specified period of time. This time period may be 48 hours from the time of lead import, for example. If the specified user fails to input information into the notes constituent screen 304, for example, or another field predetermined to indicate activity, then an e-mail is sent to the employer, an administrator, the specified user, and/or another party indicating that the lead is not being acted upon. If a specified user unsuccessfully attempts to contact an offeree within 48 hours of lead import, then the specified user would likely enter notes accounting for such attempt in the notes constituent screen 304. By entering notes, the specified user has indicated that the user is not "sitting on the lead," but is in fact being diligent and can prevent the leads management feature from wrongly notifying an employer, for example, that the user is not attempting to close a deal.

Figure 4:
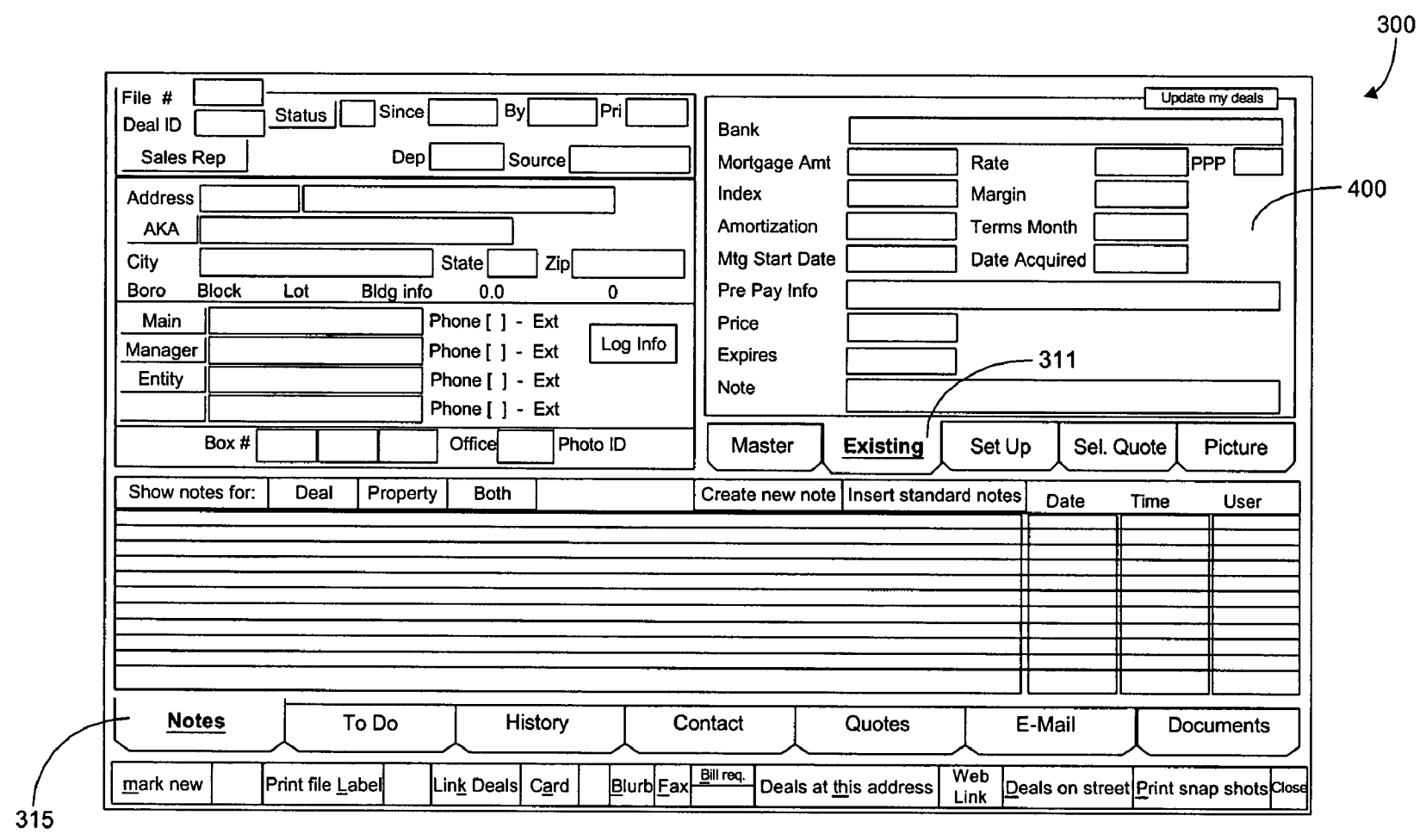

Referring to FIG. 4, an embodiment of the deal information screen 300 comprises an "existing" constituent screen 400. The existing constituent screen 400 is retrievable by the user actuating the existing button 311. The existing constituent screen 400 displays information to the user concerning the existing mortgage on the realty. In one embodiment, the existing constituent screen 400 displays information relating to the bank, mortgage amount, index, amortization, rate, PPP (pre-payment penalty), margin, terms month, mortgage start date, date acquired date, price, pre-pay information and expiration. The information displayed by the existing constituent screen 400 can be used by the user in facilitating a close with an offeree. It can also be used to update and correct inaccurate publicly available information, such as RPAD information for example. Contradictions between the information contained in the master constituent screen 303 and the information contained in the existing constituent screen 400 are likely resolved in favor of the information displayed by the existing constituent screen 400.

Figure 5:
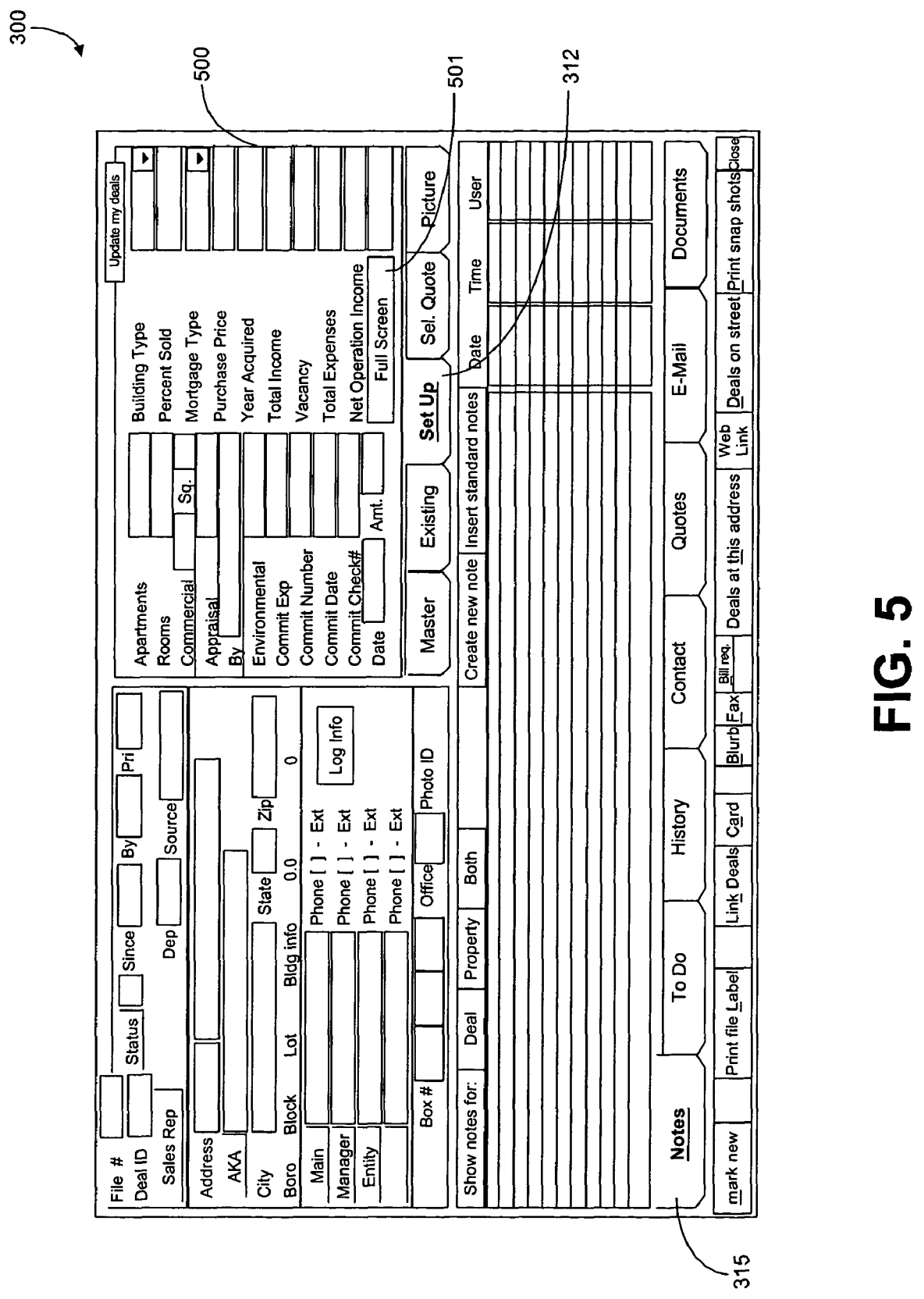

Referring to FIG. 5, an embodiment of the deal information screen 300 comprises a "set up" constituent screen 500. The set up constituent screen 500 is retrievable by the user actuating the set up button 312. The set up constituent screen 500 displays additional realty information. By way of illustration and without limitation, the set up constituent screen 500 displays the number of apartments, number of rooms, commercial units, square footage, appraisal information, environmental information, deal commitment information, building type, percent sold, mortgage information, income, vacancy, expenses, and net operating income. This information is entered and/or modified by the user by first clicking on the full screen button 501 and subsequently entering the information in the full screen set up screen 600.

Referring to FIG. 6, an embodiment of the full screen set up screen 600 comprises a property description constituent screen 601, a rent roll constituent screen 602, and an income/expenses constituent screen 603. In one embodiment, the property description constituent screen 601 comprises additional realty information such as number of buildings, whether the building has an elevator or is a "walk-up", the building size, the number of stories, frontage information, lot size, and a text description. The user can enter information in corresponding information fields. In one embodiment, the rent roll screen constituent screen 602 contains a residential rent roll button 604 and a commercial rent roll button 605 which display to the user more detailed information regarding any rent that is being paid by tenants (not shown). In one embodiment, the income/expenses constituent screen 603 contains income button 606 and/or expenses button 607 which display to the user more detailed information regarding income and expenses related to the subject realty (not shown). This detailed property information is another effective tool both in closing a hesitant offeree and in facilitating a potential transaction with an offeree for which a deal has already been closed.

Figure 7:
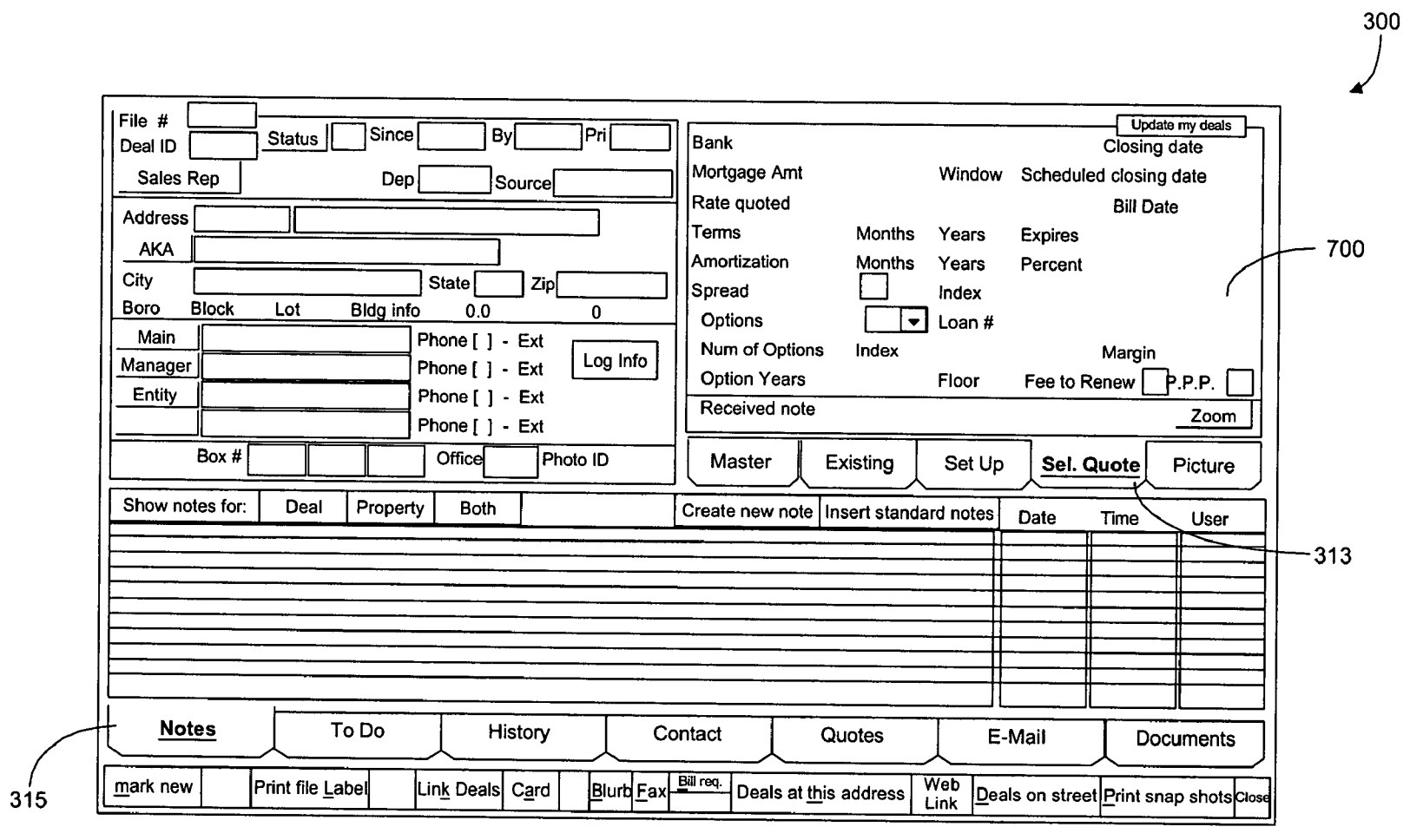

Referring to FIG. 7, an embodiment of the deal information screen 300 comprises a "select quote" constituent screen 700. The select quote constituent screen 700 is retrievable by the user actuating the select quote button 313. The select quote constituent screen 700 displays additional realty information, specifically relating to a particular refinancing offer on the subject property. By way of illustration and without limitation, the select quote constituent screen 700 displays information relating to the bank, mortgage, rate, term, amortization, spread, closing, bill, and options. This information is useful when conferring with the offeree of the particular deal for which the select quote constituent screen 700 is being displayed, however the information is also useful in subsequent deals on the same realty. In one embodiment, for example, the information contained within the constituent screen 700 is accessible in a subsequent deal on the same property when a user selects the DTA button 322.

Figure 8:
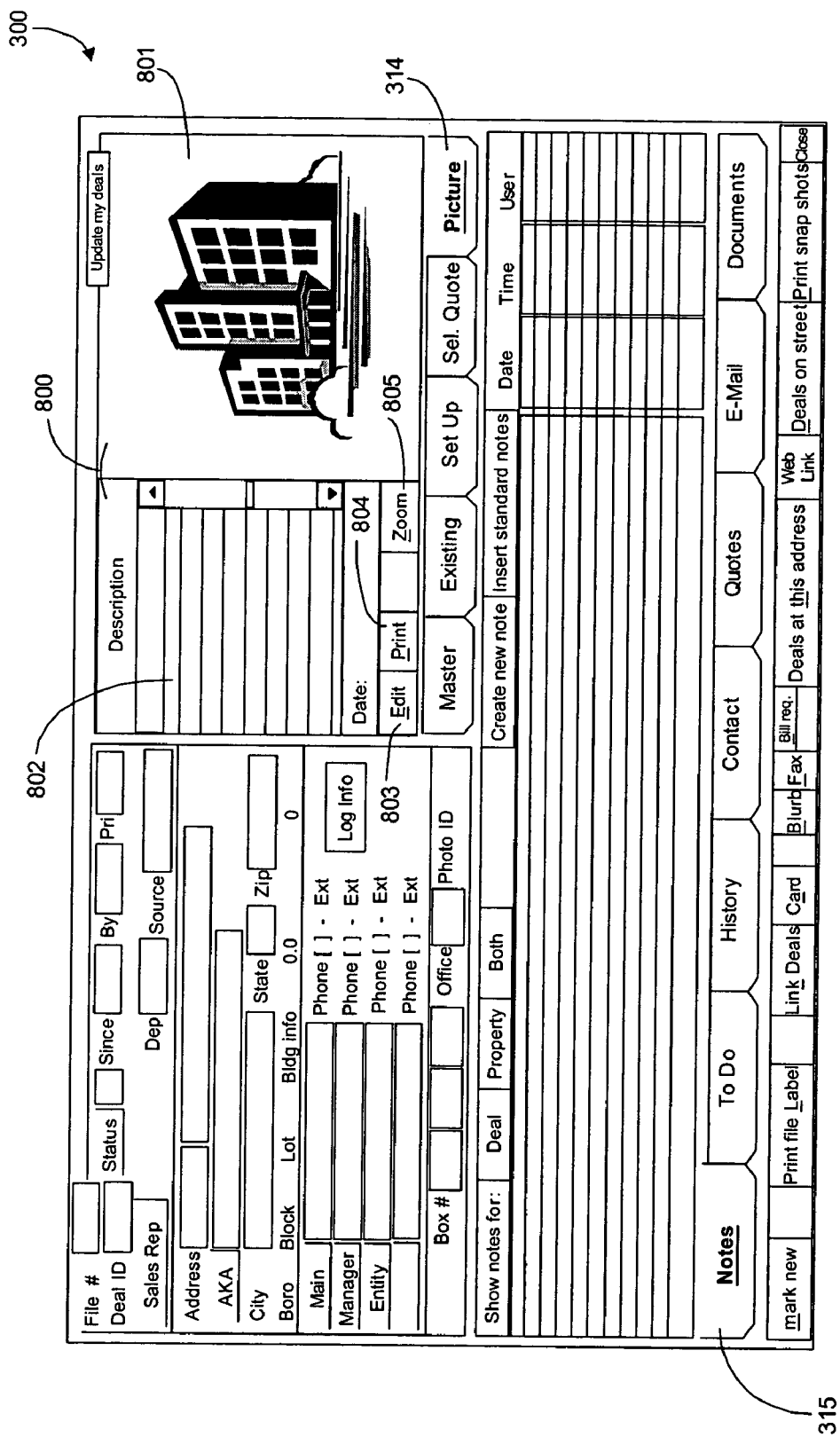
FIG. 8 is a screen diagram presenting an embodiment of the deal information screen comprising a picture constituent screen and a notes constituent screen.

Referring to FIG. 8, an embodiment of the deal information screen 300 comprises a "picture" constituent screen 800. The picture constituent screen 800 is retrievable by the user actuating the picture button 314. The picture constituent screen 800 displays a photograph 801 of the subject realty and a description field 802 for displaying a description of the subject realty. The user may add text to the description field 802 by first activating the edit button 803 and subsequently entering text into the description field 802. The description and/or photograph is sent to a printer by activating the picture constituent screen print button 804. The user can activate the picture constituent screen zoom button 805, to display a zoomed photograph 801a in the picture zoom screen 900.

Figure 9:
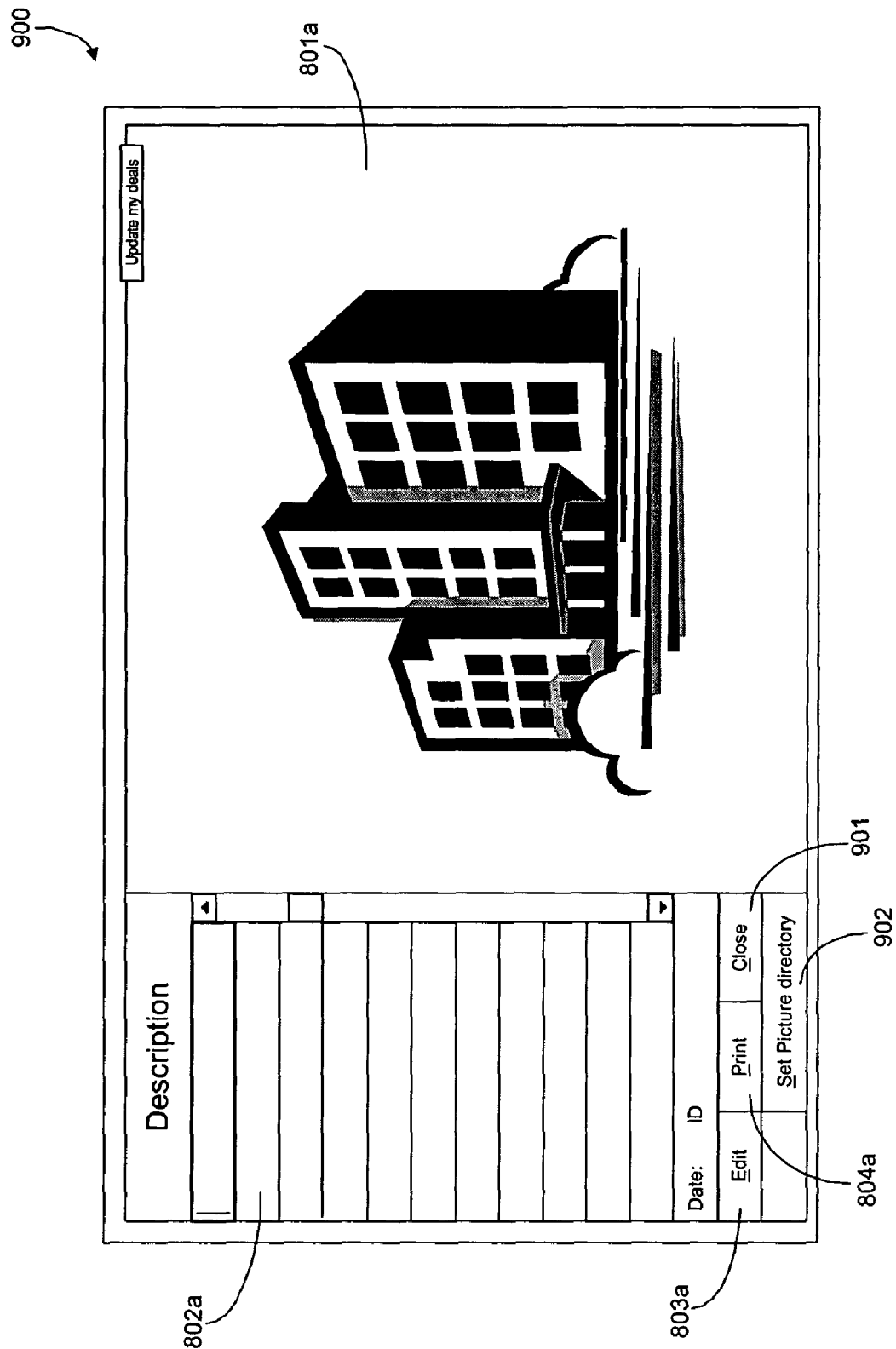
FIG. 9 is a screen diagram presenting an embodiment of the picture zoom screen.

Referring to FIG. 9, one embodiment of the picture zoom screen 900 comprises the description field 802a and functionalities analogous to those of the picture constituent screen 800 including an edit button 803a and a screen print button 804a. A user exits the picture zoom screen 900 by activating the picture zoom screen close button 901. The user can navigate through alternative pictures (and their corresponding picture descriptions) by first clicking on the set picture directory button 902 and subsequently choosing a picture (or other media) from a list of alternatives (not shown).

In one embodiment, an alternate media is used to display the subject realty. Such media includes, for example, full motion video(s), virtual tour(s), drawing(s), schematic(s), design plan(s), and/or floor plan(s). The media displays the exterior, interior, structure, and/or design of the subject realty. In one embodiment, the media display the subject realty and/or the neighborhood of the subject realty.

Figure 10:
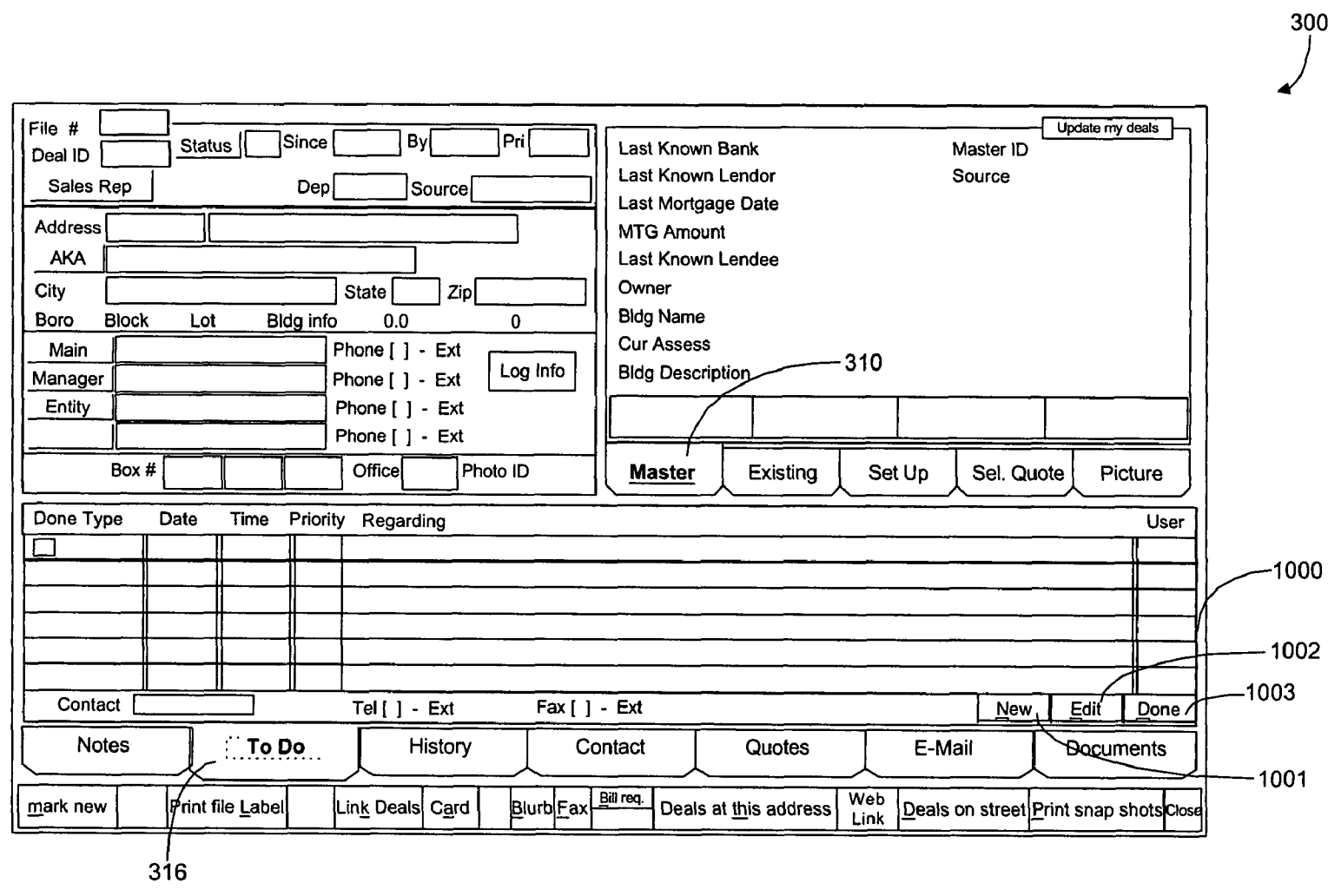

Referring to FIG. 10, an embodiment of the deal information screen 300 comprises a master constituent screen 303 and a "to do" constituent screen 1000. The "to do" constituent screen 1000 is retrievable by the user actuating the "to do" button 316 and contains information fields where the user can articulate and review future tasks concerning the subject deal. In one embodiment, the "to do" constituent screen 1000 has fields for entering date, time, priority, user/CSR, task type, a short note concerning what the task is regarding, a checkbox for indicating when the task is complete, a contact name, and contact telephone numbers. New tasks can be entered subsequent to activating the "to do" new button 1001, existing tasks can be edited subsequent to activating the "to do" edit button 1002, and tasks can be indicated as complete by activating the "to do" done button 1003.

Figure 11:
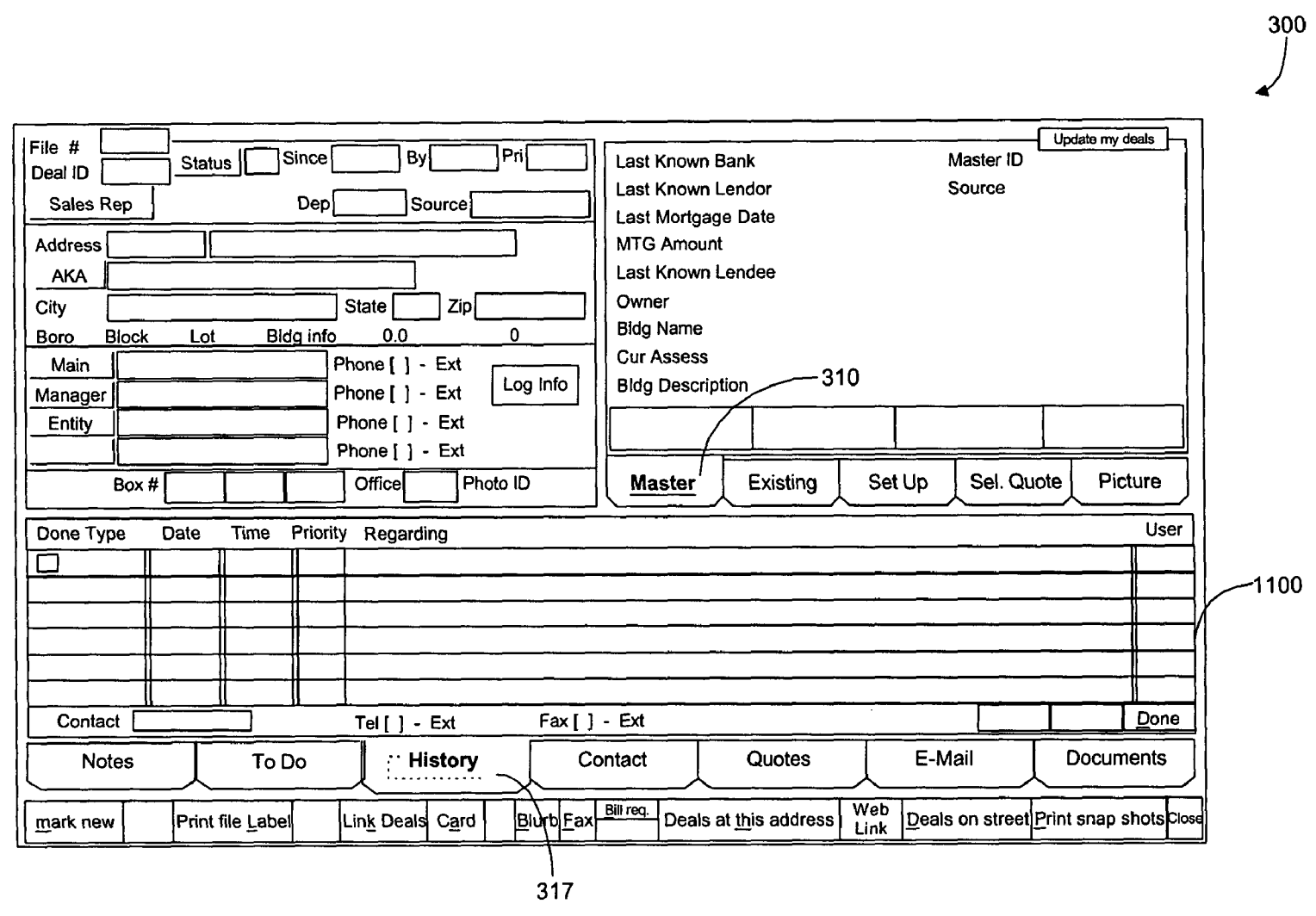

Referring to FIG. 11, an embodiment of the deal information screen 300 comprises a master constituent screen 303 and a "history" constituent screen 1100. The history constituent screen 1100 is retrievable by the user actuating the history button 317 and contains information fields where the user can articulate and review history items concerning the subject deal. In one embodiment, the history constituent screen 1100 has fields for entering date, time, priority, user/CSR, history item type, a short note concerning what the history item is regarding, a checkbox for confirming that the history item is complete, a contact name, and contact telephone numbers. A user notates the history constituent screen with actions taken in regard to the subject deal. In one embodiment, a user transfers items from the "to do" constituent screen 1000 to the history constituent screen 1100 upon completion of a task. A user can enter new history items subsequent to activating the history new button 1101, existing history items can be edited subsequent to activating the history edit button 1102, and a user can further confirm that a history item has been completed by activating the history done button 1103.

Figure 12:
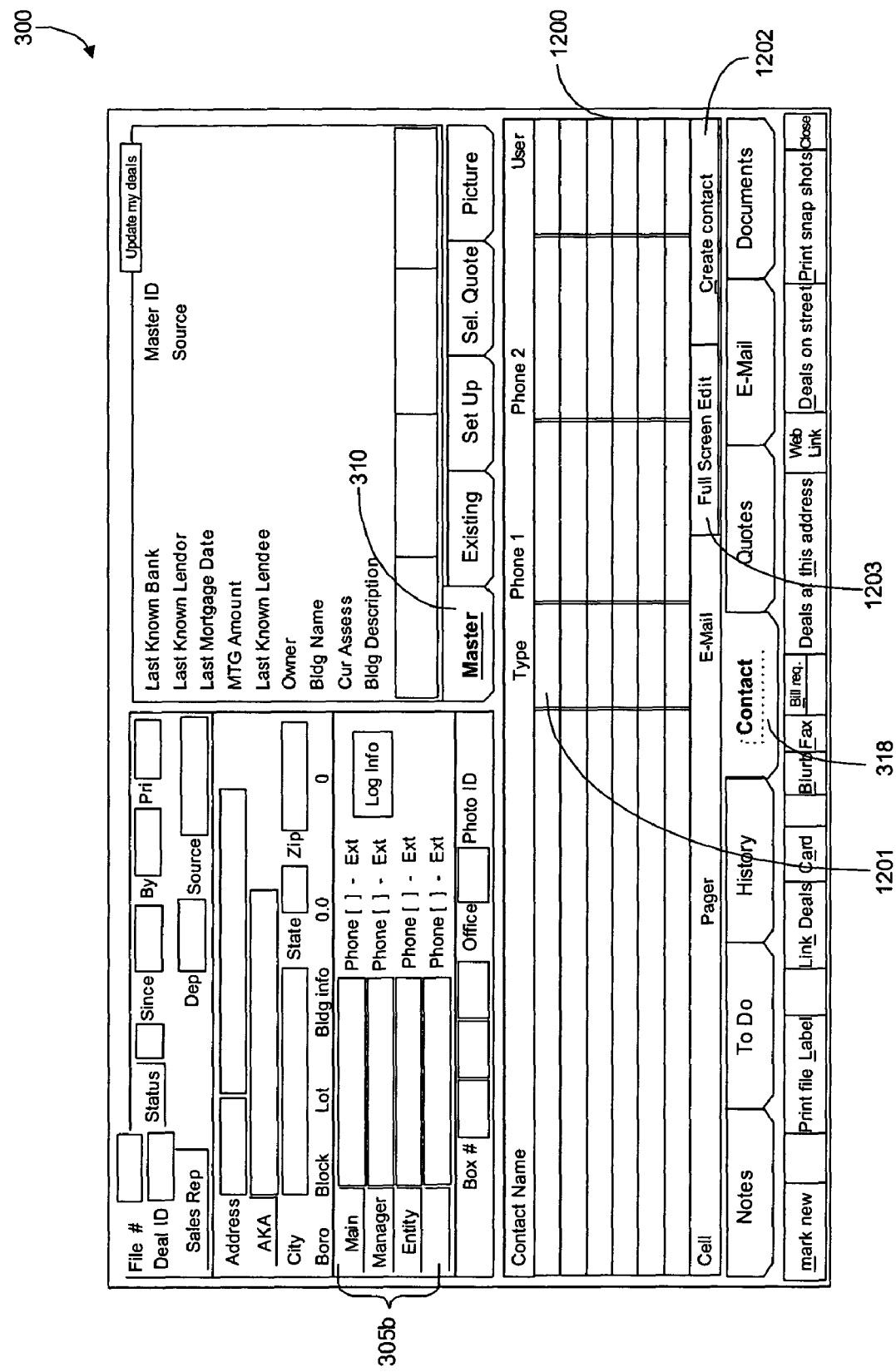
FIG. 12 is a screen diagram presenting an embodiment of the deal information screen comprising a master constituent screen and a contact constituent screen.

Referring to FIG. 12, an embodiment of the deal information screen 300 comprises a master constituent screen 303 and a "contact" constituent screen 1200. The contact constituent screen 1200 is retrievable by the user actuating the contact button 318 and contains information fields where the user can articulate and review entity and/or individual contacts relating to the subject deal. The list of contacts in the contact constituent screen 1200 can be more expansive than the contact information displayed in the contact information fields 305*b* in terms of both the number of contacts simultaneously displayed and the amount of information displayed about any contact. In one embodiment, the contact constituent screen 1200 contains information fields for contact name, type 1201, a first phone number for a contact, a second phone number for a contact, and a user/CSR. In one embodiment, the user can double-click a type information field 1201 to initiate the display of a window containing a list of common contacts (not shown). The list can include, for example, appraiser, attorney, banker, board member, main contact, owner, president, etc. The user then selects a contact from the list, which is then automatically entered into type information field 1201. A user can enter new contact items subsequent to activating the create contact button 1202, and the user can edit an existing contact subsequent to activating the contact constituent screen full screen edit button 1203.

Figure 13:
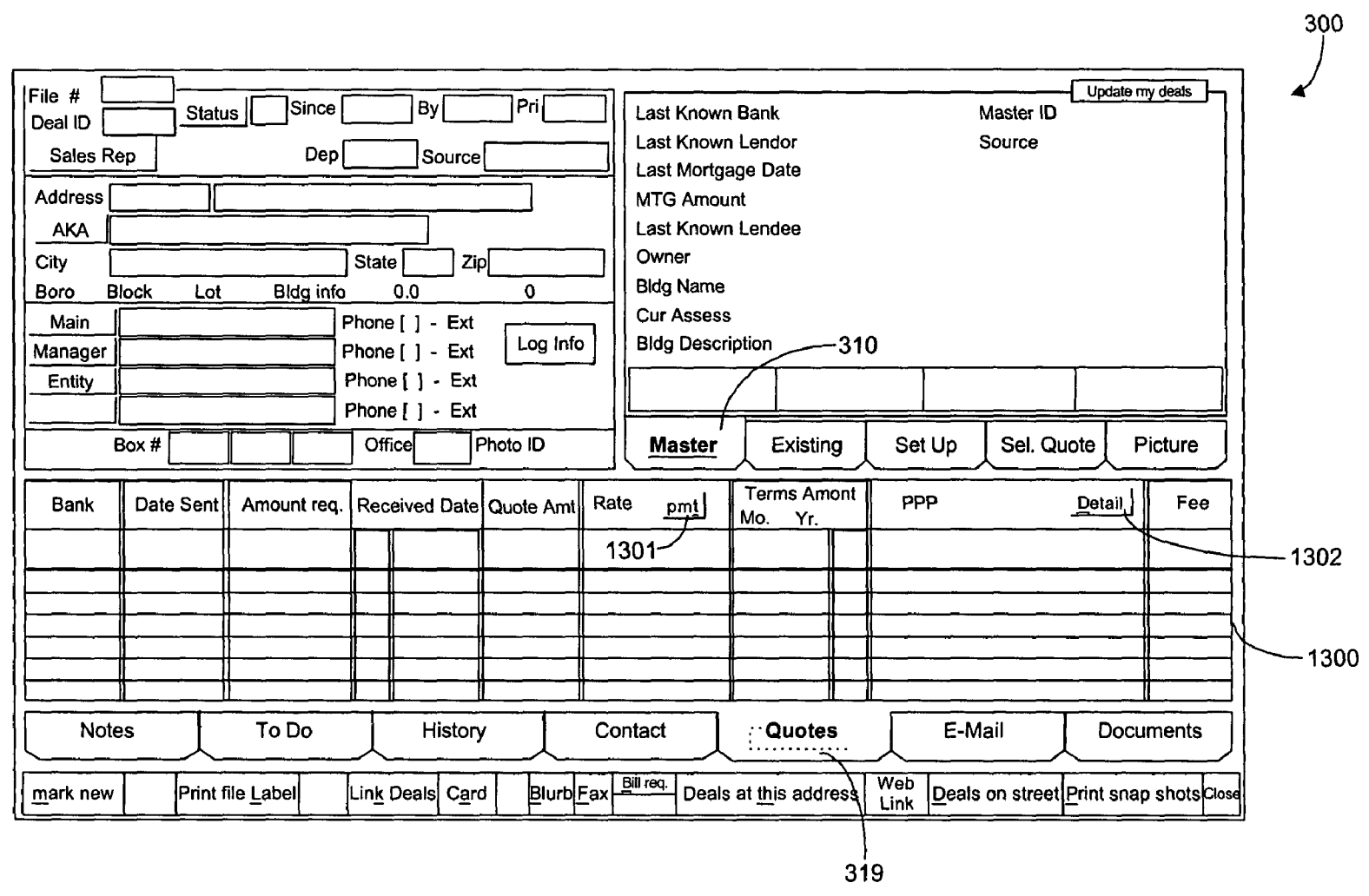

Referring to FIG. 13, an embodiment of the deal information screen 300 comprises a master constituent screen 303 and a "quotes" constituent screen 1300. The quotes constituent screen 1300 is retrievable by the user actuating the quotes button 319 and contains information fields where the user can enter and review information relating to a bank quote on a realty mortgage refinancing deal. In one embodiment, the user can enter and review quote information comprising the bank, the date the quote was sent, the amount required, the received date, the quote amount, the rate, the term length, and the fee associated with the potential loan. In one embodiment, the quotes constituent screen 1300, contains a payment ("pmt") button 1301. If the user activates the pmt button 1301, a window appears containing a payment calculator (not shown). The user enters the loan amount, rate, and amortization information into the payment calculator and the monthly payment calculator calculates and communicates to the user the monthly payment that the offeree would need to pay if the offeree accepted the given quote. In some embodiments, the quotes constituent screen 1300 contains a quotes constituent screen detail button 1302. When the user activates the detail button 1302, a screen displays additional information regarding a selected quote.

Figure 14:
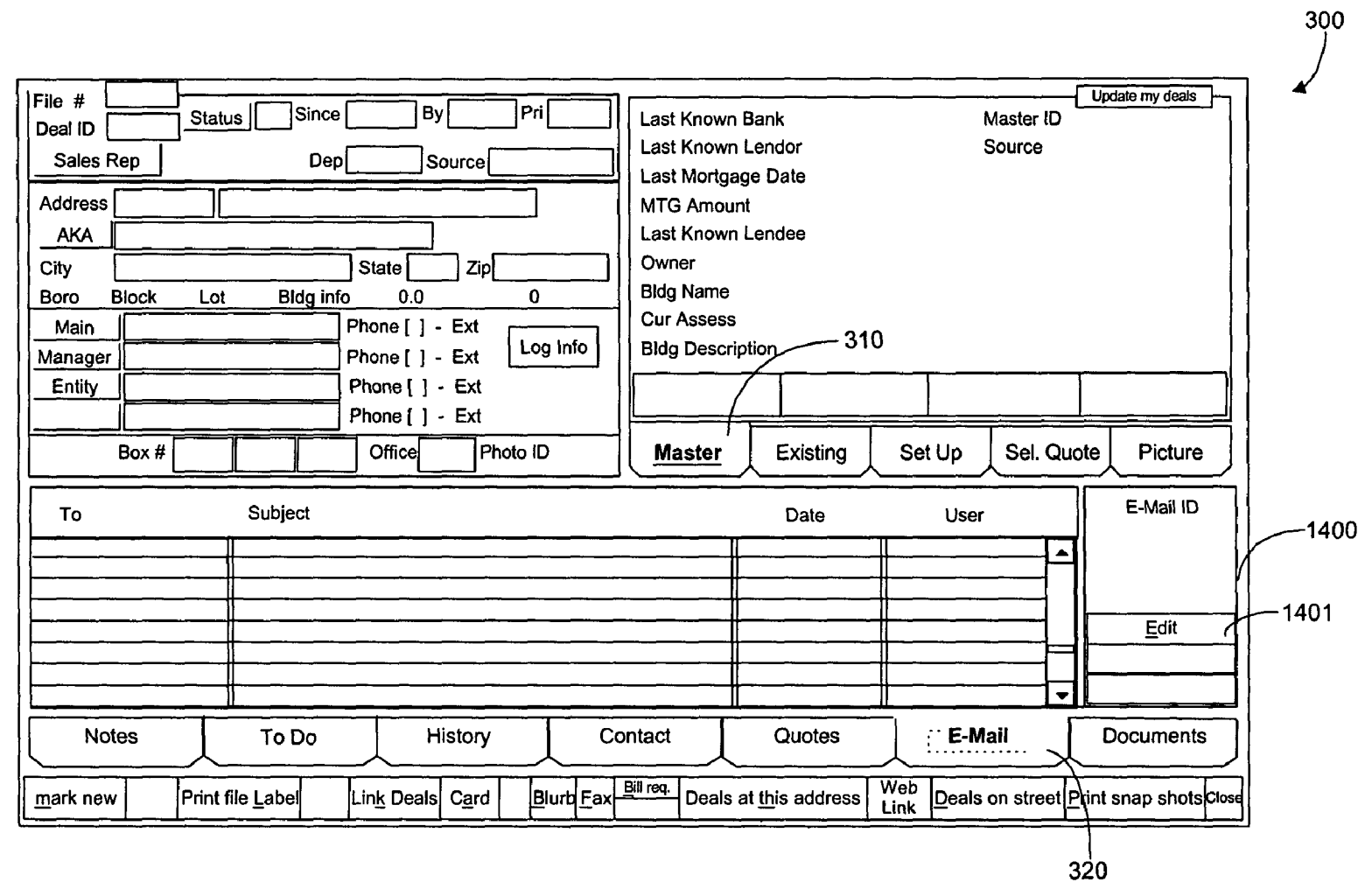

Referring to FIG. 14, an embodiment of the deal information screen 300 comprises a master constituent screen 303 and an "e-mail" constituent screen 1400. The e-mail constituent screen 1400 is retrievable by the user actuating the e-mail button 320 and contains a record of e-mail correspondence regarding the subject deal. In one embodiment, the e-mail constituent screen 1400 displays information fields concerning the recipient ("to"), date, user/CSR who sent the e-mail, and an identification number unique to the e-mail. In one embodiment, a user can view the contents of the e-mail correspondence by double-clicking on an information field related to the e-mail of interest. Users with special rights access can edit the e-mail correspondence records by first clicking on the e-mail constituent screen edit button 1401. The e-mail functionalities of the present invention will be discussed below in further detail.

Figure 15:
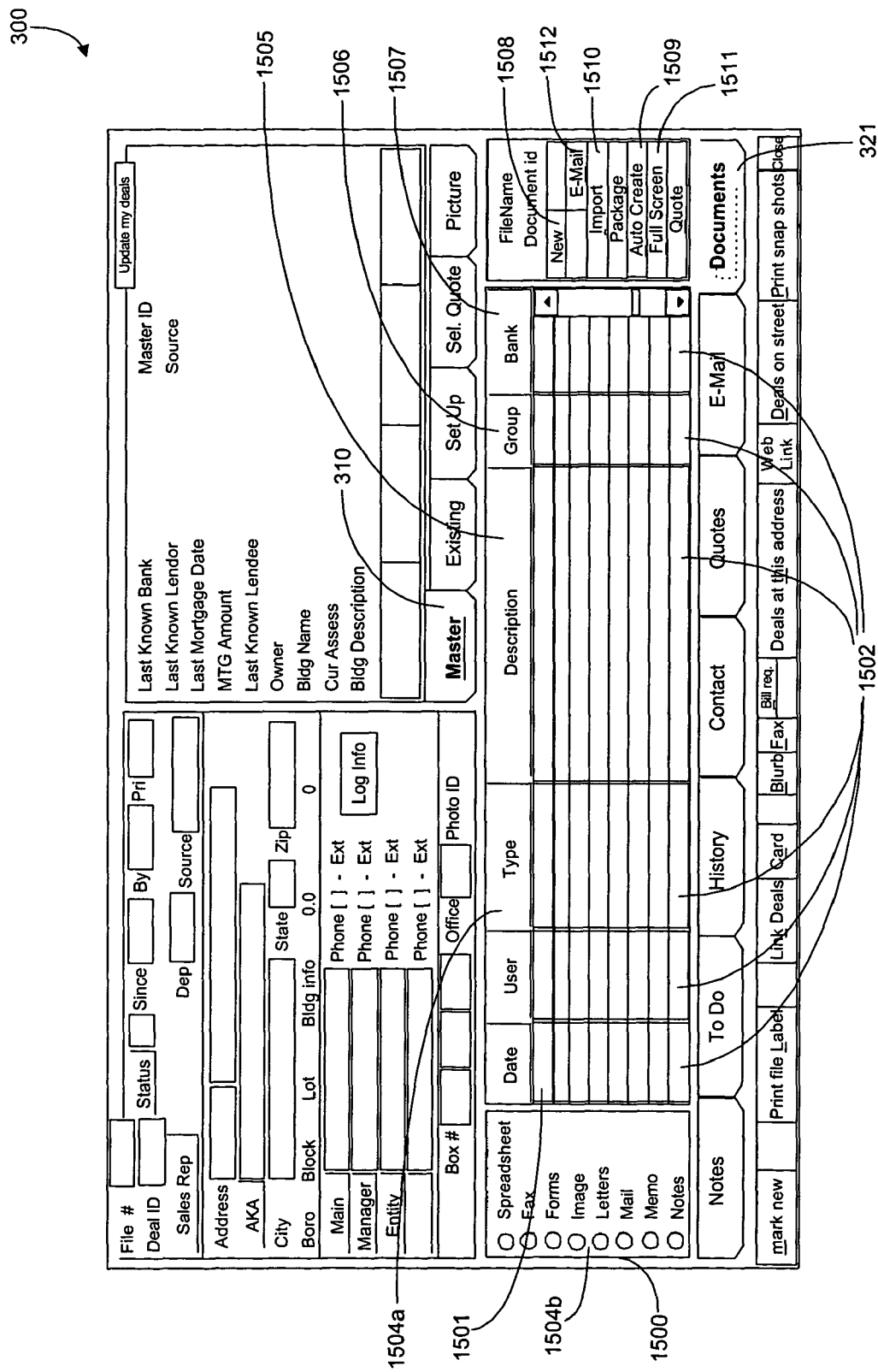
FIG. 15 is a screen diagram presenting an embodiment of the deal information screen comprising a master constituent screen and a documents constituent screen.

Referring to FIG. 15, an embodiment of the deal information screen 300 comprises a master constituent screen 303 and a "documents" constituent screen 1500. The documents constituent screen 1500 is retrievable by the user actuating the e-mail button 321 and comprises a collection of documents and/or document summaries relating to the subject realty deal. The document constituent screen 1500 contains horizontal document field sets 1501 and vertical documents field sets 1502. Each horizontal document field set 1501 comprises information fields relating to a given document and each vertical document field set 1502 comprises information fields relating to date, user/CSR, document type 1504*a*, description 1505, group 1506, and bank 1507. The document constituent screen also contains a document type list 1504*b*. The user can sort the horizontal document field sets 1501 at least by date, user, type, description, or group, by clicking on the column heading of the corresponding vertical document field set 1502. When the user scrolls over a chosen horizontal document field set 1501, the document constituent screen 1500 displays a unique file name and document ID number associated with the document corresponding to the chosen horizontal document field set 1501. The user can view the document constituent screen 1500 in a larger window, for example, by clicking on the document constituent screen full screen button 1511.

In one embodiment, the document constituent screen 1500 contains a new document button 1508, an auto create button 1509, and an import button 1510. In one embodiment, the user activates the new document button 1508 to initiate the display of another screen (not shown) where the user can customize a new document information entry, which will ultimately be displayed as a horizontal document field set 1501. Alternatively, the user activates the auto create button 1509 to initiate the display of another screen (not shown) where the user can create a new document information entry in accordance with a template, which will ultimately be displayed as a horizontal document field set 1501. In one embodiment, the user activates that import button 1510 to initiate the display of another screen (not shown) where the user can selectively import a file into the system (e.g. spreadsheet, fax, forms, image, letters, etc.) and/or scan a file into the system (e.g. spreadsheet, fax, forms, image, letters, etc.). The import function is useful for adding additional documents, information, etc. to the database files for subsequent reference by users when they are closing deals and/or facilitating any post-deal closing realty transaction.

In one embodiment, the user can initiate an e-mail function from the document constituent screen 1500 by first activating the document constituent screen e-mail button 1512. Subsequent to activating the e-mail button 1512, a new screen is displayed with an e-mail containing related information fields (e.g. to, cc:, bcc:, subject, message, etc.) (not shown). The e-mail automatically has attached the document corresponding to the horizontal document field set 1501 that the user had scrolled to prior to activating the e-mail button 1512. After the user completes any requisite e-mail information fields, the user can then send the e-mail and attached document to a recipient such as an offeree who has yet to close a deal, an offeree who closed a deal, a related entity, or any other party.

By merging the realty information from the full spectrum of available information sources and displaying the information in the organized fashion disclosed herein, a user can quickly navigate through and obtain desired information in an efficient manner that reduces both the number of sources that need to be checked as well as the amount of duplicate information that must be sifted through. For example, a user need only review the multi-constituent deal screen disclosed herein when closing a deal rather than having to obtain the desired information from a multitude of disorganized sources such as card leads, print directories, RPAD data, and public records.

This allows the user to obtain information in the amount of time necessary to facilitate smooth social interaction with an offeree. For example, if a user was attempting to close a deal without the aid of the present invention, the user would need to search through multiple collections of data, documents, directories, etc. and would unlikely find the information needed before the offeree terminated the telephone call or other communication. By contrast, if an offeree is hesitant to enter into a deal, a CSR or other user can rebut the offeree's hesitation by quickly activating the display of a screen containing information that the user feels would assist in persuading the offeree to close the deal. Thus, even a novice computer user can utilize the user-friendly GUI to obtain comprehensive data on a real-time access basis to increase the level of offeree interest, before lulls in the communication lead to communication termination. In addition, some embodiments of the present invention seamlessly interface with accounting software. In some embodiments, the present invention contains additional functionalities related to accounting practice.

By way of illustration and without limitation, the following is an example of a manner in which the disclosed invention may be used.

Figure 16:
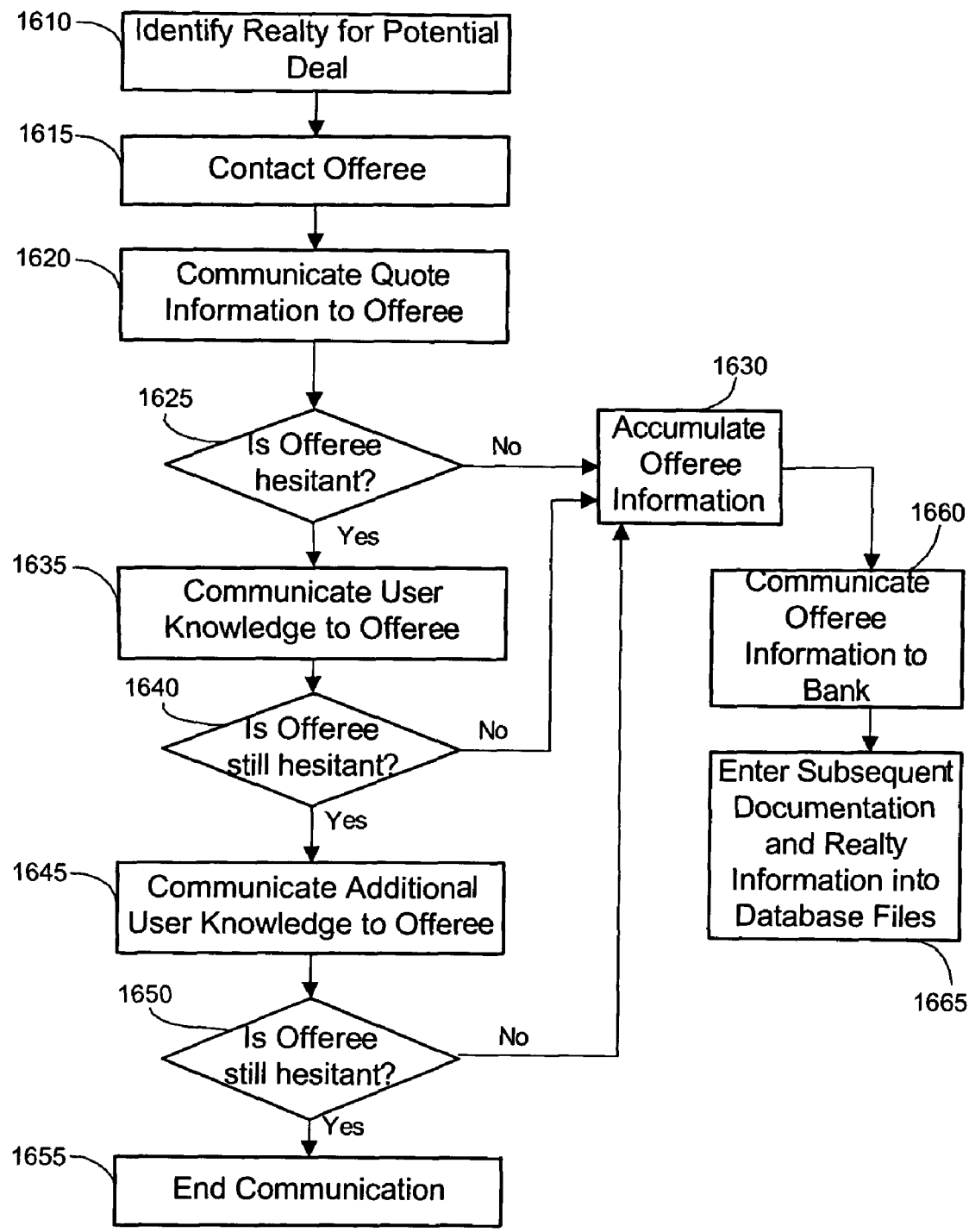
FIG. 16. is a flow chart presenting an embodiment of a deal closing.

Referring to FIG. 16, at step 1610 a user uses the master information screen 200 to search the database files and identify realty that is not already the subject of an outstanding deal. This determination is made in part based on whether there is already bank information associated with the horizontal entry set 210. At step 1615, the user then contacts the offeree based on the publicly available information displayed in the master information screen 200 and/or master constituent screen 303. Such contact is usually attempted via telephone, however the present invention contemplates all modes of communication (e.g. in person, video conference, e-mail, postal mail, etc.). The offeree is usually the owner of the property, however an offeree can be a property contact, an authorized representative, etc.

In one embodiment, the method of FIG. 16 comprises a preliminary step 1605 (not shown) of importing realty information into the database files. When data is imported, multiple spellings and articulations of the same piece of information are associated with a single piece of corresponding searchable information. For example, the pre-import articulations of a bank name may be "Third Am. Bank", "3rd American", "Third Bnk. of America", however all articulations will be associated during the import with a single piece of corresponding searchable information, such as "Third American Bank." Among other advantages, this facilitates comprehensive and efficient information sorting.

At step 1620, the user communicates information concerning at least one quote to the offeree in order to close a deal. It is then ascertained at step 1625 whether the offeree is hesitant about closing a deal and if the offeree is not hesitant then, at step 1630, the user starts accumulating additional information from the offeree regarding the subject realty and related information.

If the offeree is hesitant about closing a deal to enter into a potential realty transaction then, at step 1635, the user communicates his knowledge of the subject property to the offeree as obtained from the database files and in order to entice the offeree into entering into a deal. It is then ascertained at step 1640 whether the offeree is still hesitant about closing a deal and if the offeree is not hesitant then, at step 1630, the user starts accumulating additional information from the offeree regarding the subject realty and related information.

If the user is still hesitant about closing a deal to enter into a potential realty transaction then, at step 1645, the user communicates additional knowledge of the subject property to the offeree as obtained from the database files. This comprises the user performing any and/or all of the following tasks: activating the DOS button 309 and communicating related information to the offeree; activating the DTA button 322 and communicating related information to the offeree; discussing the photograph and/or other multi-media displayed in the picture constituent screen 801; praising attributes of the property discovered in the building information field set 205 activating the pmt button 1301 and using the payment calculator to discuss specific numbers related to the amount of money the offeree can save per month; etc. At step 1645 (and step 1635), the user can communicate any information in the database files that the user decided will be useful in closing a deal with the offeree.

It is then ascertained at step 1650 whether the offeree is still hesitant about closing a deal and if the offeree is hesitant then, at step 1655, the user ends the communication with the offeree. If the offeree is not hesitant then, at step 1630, the user starts accumulating additional information from the offeree regarding the subject realty and related information.

In one embodiment, at step 1660, a user communicates accumulated offeree information to the bank associated with an offeree-selected quote. At step 1665, the user enters subsequent documentation and realty information into the database files. The user(s) accrue an additional increment of offeree-related knowledge when the subsequent documentation and realty related information is entered into the database files. This additional knowledge can be used by a user in a subsequent attempt to close another deal with the same (or different) offeree.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A method for using a computer system to facilitate a deal related to a mortgage refinancing on a first real property, the method comprising:

storing in a database (i) realty data identifying a plurality of real properties including address data associated with each real property, and (ii) deal data identifying a plurality of deals for mortgage refinancing previously closed on at least some of the real properties in the realty data;

displaying on a computer display a deal information screen including data obtained from the database identifying one or more of the plurality of real properties, the deal information screen containing a first user actuatable button, a second user actuatable button, and a third user actuatable button;

allowing the user to select one of the real properties displayed in the deal information screen;

in response to the user actuating the first user actuatable button by a single user selection, searching the database for first deal data comprising one or more previously closed deals for mortgage refinancing at the same address as the selected real property, retrieving the first deal data, and displaying the first deal data on the computer display;

in response to the user actuating the second user actuatable button by a single user selection, searching the database for second deal data comprising one or more previously closed deals for mortgage refinancing at addresses located on the same street as the first real property, retrieving the second deal data, and displaying the second deal data on the computer display; and in response to the user actuating the third actuatable button by a single user selection, searching the database for additional information about the selected real property, retrieving the additional information, and displaying the additional information on the computer display.

2. The method of claim 1, wherein the additional information comprises mortgage data derived from a publicly available source and nonpublic, proprietary deal information.

3. The method of claim 1, wherein the additional information comprises quote data representing one or more quotes for mortgage refinancing related to the selected real property.

4. The method of claim 1, wherein the additional information comprises notes data representing notes previously entered by the user regarding an offer to refinance the mortgage on the selected real property.

5. The method of claim 1, wherein the additional information comprises history data representing one or more events in the history of a deal associated with the selected real property.

6. The method of claim 1, wherein the additional information comprises data representing tasks to be done related to a deal associated with the selected real property.

7. The method of claim 1, wherein, in response to the user actuating the first user actuatable button by a single user selection, searching the database for first deal data comprising one or more deals previously closed by the user at the same address as the selected real property, retrieving the first deal data and displaying the first deal data on the computer display.

8. The method of claim 1, wherein, in response to the user actuating the second user actuatable button by a single user selection, searching the database for second deal data comprising one or more deals previously closed by the user at an address located on the same street as the address of the selected real property, retrieving the second deal data and displaying the second deal data on the computer display.

9. The method of claim 1, wherein, the search for second deal data is performed in the database for one or more deals previously closed by the user at an address located on the same street as the address of the selected real property.

10. A computer system for facilitating a deal related to a mortgage refinancing on a first real property, the system comprising:
   a database storing (i) realty data identifying a plurality of real properties including address data associated with each real property, and (ii) deal data identifying a plurality of deals for mortgage refinancing previously closed on at least some of the real properties in the realty data;
   a display for displaying a deal information screen including data obtained from the database identifying one or more of the plurality of real properties, the deal information screen containing a first user actuatable button, a second user actuatable button, and a third user actuatable button;
   an input device for use by the user in selecting one of the real properties displayed in the deal information screen;
   a programmed processor for causing:
      in response to the user actuating the first user actuatable button by a single user selection, a search to be performed in the database for first deal data comprising one or more previously closed deals for mortgage refinancing at the same address as the selected real property, and the first deal data to be retrieved and displayed on the display;
      in response to the user actuating the second user actuatable button by a single user selection, a search to be performed in the database for second deal data comprising one or more previously closed deals for mortgage refinancing at addresses located on the same street as the first real property, and the first second deal data to be retrieved and displayed on the display; and
      in response to the user actuating the third user actuatable button by a single user selection, a search to be performed in the database for additional information related to the selected first real property, and the additional information to be retrieved and displayed on the display.

11. The method of claim 10, wherein the additional information comprises mortgage data derived from a publicly available source and nonpublic, proprietary deal information.

12. The method of claim 10, wherein the additional information comprises quote data representing one or more quotes for mortgage refinancing related to the selected real property.

13. The method of claim 10, wherein the additional information comprises notes data representing notes previously entered by the user regarding an offer to refinance the mortgage on the selected real property.

14. The method of claim 10, wherein the additional information comprises history data representing one or more events in the history of a deal associated with the selected real property.

15. The method of claim 10, wherein the additional information comprises data representing tasks to be done related to a deal associated with the selected real property.

16. The method of claim 10, wherein the search for first deal data is performed in the database for one or more deals previously closed by the user at the same address as the selected real property.

* * * * *